United States Patent Office  
3,256,226  
Patented June 14, 1966

3,256,226  
HYDROXY POLYETHER POLYESTERS HAVING TERMINAL ETHYLENICALLY UNSATURATED GROUPS  
Frank Fekete, Pittsburgh, Pa., Patrick J. Keenan, Princeton, N.J., and William J. Plant, Pittsburgh, Pa., assignors to H. H. Robertson Company, Pittsburgh, Pa., a corporation of Pennsylvania  
No Drawing. Filed Mar. 1, 1965, Ser. No. 436,996  
13 Claims. (Cl. 260—23.5)

This application is a continuation-in-part of our copending application S.N. 160,248, filed December 18, 1961.

This invention relates to long chain polymerizable polymers having terminal ethylenically unsaturated groups and including plural pendant hydroxy groups and plural ester linkages, their preparation and use.

More particularly this invention relates to polyhydroxy polyesters essentially free of unreacted epoxy radicals and essentially free of —COOH radicals. The polymers are prepared by reaction of three ingredients as follows:
 (1) Dicarboxylic acids;
 (2) Ethylenically unsaturated monocarboxylic acids;
 (3) A diepoxy compound such as an epoxy resin (for example an epoxy resin that is the reaction product of epichlorohydrin and Bisphenol-A). Bisphenol-A is 2,2′-bis(4-hydroxy phenyl) propane. In general such diepoxy compounds have the following formula:

(divalent organic radical)—[—$(CH_2)_m CHCH_2$]$_2$ (with epoxide O)

wherein $m$ is an integer from one through ten, and the two epoxy groups are connected to the divalent organic radical through ether linkages.

The divalent organic radical usually is a divalent radical derived from dihydric phenols, including polynuclear phenols, polycyclic phenols. The divalent organic radical also may be derived from divalent aliphatic radicals such as alkane diols and polyalkane diols.

Where the diepoxy compound is derived from Bisphenol-A and epichlorohydrin, the compound has the formula $CH_2CHCH_2$—[—O—⟨Ar⟩—C$(CH_3)_2$—⟨Ar⟩—O$CH_2CHCH_2$—]$_n$—O—⟨Ar⟩—C$(CH_3)_2$—⟨Ar⟩—O$CH_2CHCH_2$  
 |  
 OH wherein $n$ is integer of zero or more according to the degree of polymerization.

Where the diepoxy compound is formed from an alkane diol such as 1,4-butane diol, the compound has the formula $CH_2CHCH_2$—[—O$C_4H_8$O$CH_2CHCH_2$—]$_n$—O$C_4H_8$O$CH_2CHCH_2$  
 |  
 OH wherein $n$, as before, is an integer of zero or more according to the degree of polymerization.

The present products in general will have terminal ethylenically unsaturated groups where the monobasic carboxylic acid has its ethylenic unsaturation. Moreover the present compounds will possess interposed and units of $$R\left(\overset{O}{\underset{\|}{C}}O-\right)_2$$

which are derived from the dicarboxylic acid $R(COOH)_2$;

and units of

—$CH_2CHCH_2OR'OCH_2CHCH_2$—  
 |                   |  
 OH                  OH which are derived from the diepoxy compounds $$R'-[-OCH_2\overset{O}{\underset{\triangle}{CH}}CH_2]_2$$

As an example of the product of the present invention, consider the product of the reaction between two mols acrylic acid, one mol phthalic acid and two mols of the epoxy resin prepared from epichlorohydrin and Bisphenol-A having an epoxy equivalent of about 173.

$CH_2=CHC(O)O—CH_2CHCH_2O$—⟨Ar⟩—C$(CH_3)_2$—⟨Ar⟩—O$CH_2CHCH_2$O—C(=O)—⟨phthalate⟩  
 |                                                         |  
 OH                                                        OH $CH_2=CHC(O)O—CH_2CHCH_2O$—⟨Ar⟩—C$(CH_3)_2$—⟨Ar⟩—O$CH_2CHCH_2$O—C(=O)—⟨phthalate⟩  
 |                                                         |  
 OH                                                        OH The ethylenically unsaturated monobasic carboxylic acid (acrylic acid) serves as the chain terminator for the present polymers and provides terminal ethylenic unsaturation for subsequent cross-linking of the polymers. The remainder of the polymer chain is formed from alternating units of the dicarboxylic acid and the diepoxy compound. The product polymer is essentially free of unreacted epoxy groups and essentially free of unreacted —COOH groups.

The sequence of reaction preferably involves initial reaction between one mol of the diepoxy compound and from 0.5 to 0.9 mol of the dicarboxylic acid according to the length of intermediate chain desired in the final polymer. The product of the initial reaction is essentially free of unreacted —COOH groups and consists essentially of a polymeric diepoxy intermediate substance. Thereafter the ethylenically unsaturated monobasic carboxylic acid is added to the diepoxy intermediate substance to complete the present polymer formation. The product polymer is essentially free of unreacted epoxy radicals via reaction with the dicarboxylic acids and monobasic carboxylic acids.

It is possible, of course, to add all three of the reactants at one time to a reaction mixture.

The present compositions are useful as polymerizable materials. Useful molded articles and laminated articles can be fabricated from these compositions, such as electrical armature slot-sticks, laminated sheets for electrical insulation. The compositions are useful as encapsulating compositions for electrical components and as gel-coat resins for molding dies which are used to mold plastic components, such as aircraft body and frame components. The present compositions may be blended with other polymerizable ethylenically unsaturated materials such as monomeric cross-linking reagents such as styrene, vinyl toluene, divinyl benzene, acrylic acid, methacrylic acid, methyl and ethyl esters of acrylic and methacrylic acid, and the like to form copolymerizable resinous mixtures which may be liquid or solids. The present compositions are especially reactive under vinyl addition conditions because of the presence of the terminal ethylenically unsaturated groups in the polymer. The present compositions can be blended with conventional unsaturated polyester resin syrups to copolymerize therewith. Such conventional unsaturated polyester resin syrups usually contain a quantity of ethylenically unsaturated cross-linking monomer such as styrene. Such polyester resin syrups usually contain the polyesterification reaction product of polyhydric alcohol and dicarboxylic materials consisting of dicarboxylic acids or dicarboxylic acid anhydrides. At least a portion of the dicarboxylic acid or the dicarboxylic acid anhydride contains alpha,beta-ethylenic unsaturation.

The present compositions, by virtue of their pendant hydroxyl groups, are also reactive in customary hydroxyl-type condensations. The presence of the hydroxyl groups in an unreacted condition (when the materials are subjected to vinyl additions) enhances the adhesive qualities of the resulting polymerized mass.

REACTANTS—(1) DICARBOXYLIC ACID

As a starting material in the present process, the dicarboxylic acid has the general formula $R(COOH)_2$ wherein R is an organic radical which may consist of:

A carbon-to-carbon bond (e.g., oxalic acid);
An aliphatic radical (e.g., adipic acid);
An ethylenically unsaturated aliphatic radical (e.g., maleic acid);
An aryl radical (e.g., phthalic acid); and
Halogenated aryl radicals (e.g., tetrachlorophthalic acid).

Where the dicarboxylic acid of this invention also includes ethylenic unsaturation (e.g., maleic acid, fumaric acid), the resulting polyester will contain additional ethylenically unsaturated sites for subsequent cross-linking and copolymerization.

It is possible to utilize as the dicarboxylic acid for this invention a double ester formed from two mols of a dicarboxylic acid anhydride and one mol of a dihydric alcohol. For example, the double ester of maleic acid anhydride and ethylene glycol:

It will be observed that the double ester possesses two terminal carboxylic acid groups which, for the present purposes, qualify the material as a dicarboxylic acid.

Suitable acids include phthalic acid, isophthalic acid, terephthalic acid, maleic acid, fumaric acid, succinic acid, adipic acid, and their halogenated derivatives such as tetrachlorophthalic acid, tetrabromophthalic acid and the like.

A particularly useful dicarboxylic acid is the dimer-acid which is obtained through dimerization of naturally occurring fatty acids having long unsaturated chains. The dimer acids may be represented as

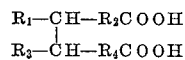

wherein $R_1$, $R_2$, $R_3$ and $R_4$ are probably straight chain hydrocarbons although not necessarily of the same length. One or more of these groups as well as the linkage between the two carbon atoms may contain unsaturation which is quite inactive. The dimer usually is accompanied by some trimer. Dimerization of naturally occurring $C_{18}$ fatty acid yields the $C_{36}$ dimer acid which is a dicarboxylic acid especially well suited to the present invention.

REACTANTS—(2) UNSATURATED MONOBASIC CARBOXYLIC ACID

As a starting material in the present process, an ethylenically unsaturated monobasic carboxylic acid is employed.

Suitable acids include acrylic, methacrylic, crotonic, cinnamic and the like.

As another carboxylic acid material, it is possible to use half-esters formed by esterification of one mol of a hydroxy compound (such as alcohols), with one mol of an anhydride of an ethylenically unsaturated dicarboxylic acid such as maleic acid anhydride, and the like. For example, the half-ester of ethyl alcohol and maleic acid anhydride:

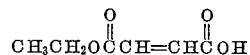

will provide an ethylenically unsaturated terminal group for the resulting polymer. The half-esters of the ethylenically unsaturated dicarboxylic acid anhydrides are, in effect, ethylenically unsaturated monobasic carboxylic acids and are contemplated within the scope of this invention.

REACTANTS—(3) THE DIEPOXY COMPOUND

In general the diepoxy compound of this invention will have the formula

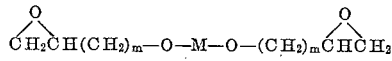

wherein $m$ is an integer from one to ten and $m$ is a divalent organic radical which is derived from dihydroxy compounds selected from the class consisting of dihydric phenols and alkane diols, including polyalkane diols. The diepoxy composition shall be essentially free of substituents which would react with its own epoxy groups. The diepoxy composition should be essentially free of substituents capable of reacting with a —COOH radical other than hydroxyl radicals.

Where the dihydric phenols are selected, the compounds in general have the formula

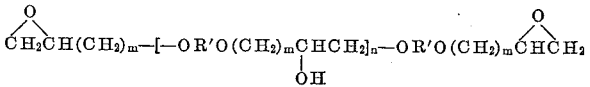

wherein $m$ is an integer from one to ten;
$n$ is an integer from zero to twenty; and
$R'$ is a divalent organic radical derived from a dihydric phenol.

When derived from polycyclic dihydric phenols, $R'$ may have the formula

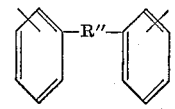

wherein $R''$ is a carbon-to-carbon bond (biphenyl); a divalent aliphatic chain (bisphenols); a divalent aryl radical (polyphenyl); a —COOH substituted divalent aliphatic radical (diphenolic acid). A typical diphenolic acid is 2,2'-bis(4-hydroxy phenyl) propionic acid.

The aryl rings may be ring-substituted with lower alkyl groups and halogens.

The divalent organic radical $R'$ also may be a dihydric phenol derivative

and a polynuclear phenol derivative

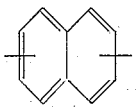

The epoxy equivalent of the preferred diepoxy compounds ranges from about 100 to about 3000. Where R' is derived from a dihydric phenol such as resorcinol, its epoxy equivalent is about 100 where the value of $n$ is zero.

Proportions

The molar quantity of dicarboxylic acid and half the molar quantity of monobasic carboxylic acid equals the molar quantity of the diepoxy compound. Since the ratio of dicarboxylic acid to the diepoxy compound is from 0.5 to about 0.9, the ratio of monobasic carboxylic acid to the diepoxy compound correspondingly is from 1.0 to about 0.2. A slight excess of the monobasic carboxylic acid promotes completion of the reaction, i.e., the product is essentially free of unreacted epoxy groups.

Inhibitor

Because of the presence of reactive ethylenically unsaturated groups in the reaction mixture, it is essential to maintain an inventory of a suitable vinyl-polymerization inhibitor in the reaction mixture and also in the product composition. Any of the hydroquinones and quinones have been found to be suitable for this purpose, although it is generally preferred to employ the quinones since the hydroquinones tend to enter into reaction with epoxy groups of the starting materials. Toluquinone and toluhydroquinones are preferred inhibitors since the reaction products appear to be clearer when toluquinone or toluhydroquinone is employed as the inhibitor. Other successful inhibitors include p-quinone, 2,5-dimethyl-p-benzoquinone, 1-4-naphthaquinone, anthraquinone, chloranil.

Catalyst

As catalyst for the monomer formation reaction, triethylamine is preferred for reasons of expense, availability and ease of handling. Other tertiary amines may be adapted as the catalyst. Approximately one percent by weight of the catalyst based upon the weight of reactants is suitable.

Reaction conditions

Although not employed in Example 1, there is a preferred heating regime for the formulation of the present polymers. Substantial difficulties have been encountered from premature gelation of the reaction mixtures during polymer formation. The preferred heating regime appears to avoid these undesirable gelation difficulties. Specifically the starting reactants together with inhibitor and catalyst are introduced into a reaction kettle. If desired, a suitable inert solvent may be employed. The reaction mixture is heated from ambient room temperature to a first temperature level between ambient room temperature and about 100° C. over a relatively long heating period, e.g., from about 30 minutes to about five hours. The reaction mixture is maintained at the first temperature level until substantial decrease in the acid number of the reaction mixture has been observed indicating that substantial polymer formation has occurred. Thereafter the reaction mixture is heated to a second temperature level which is greater than the first temperature level and is between about 80° C. and about 200° C. for completion of the reaction. The heating regime which comprises at least two sequential stages appears to avoid the undesirable gelation formations. The cycle may be repeated for the subsequent addition of monobasic carboxylic acid.

An alternative reaction procedure also has been demonstrated to be effective in the present monomer formation reactions. The dicarboxylic acid is heated with catalyst (and an inhibitor, if required) to a suitable temperature between ambient room temperature and about 200° C. Thereafter the epoxy compound is added to the heated dicarboxylic acid in a dropwise manner while the heated acid is continuously stirred. The monobasic carboxylic acid may be added dropwise to the intermediate product while maintaining the contents of the reaction kettle under agitation.

Inert solvents also may be employed in the reaction mixtures especially where the reactants or products are highly viscous. Xylene and toluene have been found to be suitable solvents for many of the present polymer formation reaction mixtures. Preferably, of course, the solvents are not employed thereby avoiding initial solvent expenses and the costs of repeatedly reboiling solvents.

The present products can be characterized by considering the dicarboxylic acid of formula $R(COOH)_2$, the diepoxide of formula

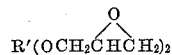

and the ethylenically unsaturated monocarboxylic acid of formula R*COOH. The present composition is prepared by initial reaction of the dicarboxylic acid and the diepoxide to yield an intermediate hydroxyl-containing diepoxide:

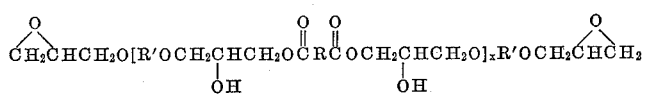

where $x$ is an integer of 1 to 10. That diepoxide is reacted with the ethylenically unsaturated monocarboxylic acid R*COOH to yield the present polyester essentially free of unreacted epoxy groups:

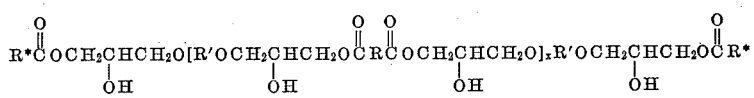

The product polyester has ethylenically unsaturated terminal groups and has alternating units of

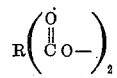

where R is the divalent organic radical derived from the dicarboxylic acid

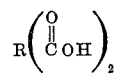

and units of

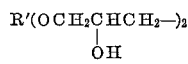

wherein R' is the divalent organic radical derived from the diepoxide

In all of the resin formulations triethylamine was the catalyst in the amount of 1 percent by weight of the reactants. The inhibitor in all cases was toluhydroquinone.

The reactants and reaction conditions are tabulated in the following Table I.

Fumaric and terephthalic acids were selected as the dicarboxylic acid.

TABLE I.—EXAMPLES OF POLYMERIZABLE POLYMERS

| Resin | DER-332, mols | Methacrylic Acid, mols | Dicarboxylic Acid, mols | Temperature, °C. | Time, hrs. | Final Acid Number |
|---|---|---|---|---|---|---|
| 3 | 1.0 | 1.0 | Fumaric, 0.5 | (a) 90 | 4.0 | 5 |
|   |     |     |              | (b) 100 | 1.5 |   |
| 4 | 3.3 | 3.0 | Fumaric, 1.5 | 90 | 4.5 | 8 |
|   |     |     |              |    | 3.0 |   |
| 5 | 1.0 | 1.0 | Terephthalic, 0.5 | (a) 90 | 3.0 | 2 |
|   |     |     |                   | (b) 110 | 3.0 |   |
|   |     |     |                   | (c) 120 | 3.0 |   |

*Example 1.*—The following ingredients were mixed in a reaction kettle:

1 mol Epon 828 (390 g.)
1 mol crotonic acid (95 g.). *Note.*—The crotonic acid contained 10 percent water.
0.5 mol phthalic acid (83 g.)
1 wt. percent triethylamine (7.9 ml.)
600 p.p.m. toluhydroquinone (0.340 g.)

The reaction kettle was heated at 110° C. for five hours. The acid number dropped to 10.4 indicating approximately 95 percent conversion of the reactants. The product was a solid resinous material.

The product was mixed with an equal weight of an acrylate and copolymerized to a brittle solid after addition of a polymerization initiator.

Epon 828 is an epoxy resin prepared from epichlorohydrin and Bisphenol-A having an epoxy equivalent of 195.

*Example 2.*—A mixture of the following ingredients was placed in a reaction kettle:

1.1 mols Stabilizer-A (Bakelite) (422 g.)
1 mol methacrylic acid (86 g.)
0.5 mol fumaric acid (58 g.)
1 wt. percent triethylamine (4.9 g.)
2.5 millimols toluhydroquinone (0.310 g.)

The kettle was heated at 90° C. for 4.5 hours. The final acid value of the reaction mixture was 20. The product was an extremely viscous material which was diluted with styrene to form a solution containing 30 percent styrene by weight. The styrene solution had a viscosity of 7500 cps. at 25° C. By adding a polymerization initiator to the styrene solution, the material copolymerized in a mold to form a molded solid article having a Barcol hardness value of 31–34.

Stabilizer-A is the trade name of a commercially available epoxy resin prepared from epichlorohydrin and Bisphenol-A having an epoxy equivalent of 173.

*Examples 3–5.*—A series of resins according to this invention was prepared utilizing methacrylic acid as the ethylenically unsaturated monobasic carboxylic acid and utilizing DER-332 as the diepoxy compound. DER-332 is the trade name for a commercially available epoxy resin which is prepared from epichlorohydrin and Bisphenol-A having an epoxy equivalent of about 173–174 and the following formula:

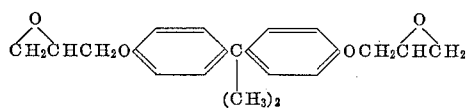

The product resins were uniformly amber-colored syrups. Each resin was diluted with styrene (30 parts by weight of styrene for each 100 parts by weight of resin) to prepare a copolymerizable resinous composition. Benzoyl peroxide (one percent by weight) was added to the styrene solutions as a polymerization initiator. The viscosity of the styrene solutions and the Barcol Hardness development of the compositions are set forth in the following Table II.

TABLE II.—COPOLYMERIZATION OF THE POLYMERS OF TABLE I

| Resin | Viscosity of Diluted Polymer, c.p.s. | Barcol Hardness |
|---|---|---|
| 3 | 3,200 |  |
| 4 | 1,800 | 32–35 |
| 5 | 8,100 | 24–28 |

It will be observed from Table II that the present polymers readily copolymerize with styrene. Other monomers useful as copolymerizing cross-linking reagents that include a terminal $CH_2=C<$ radical are vinyl toluene, divinyl benzene, methacrylic acid, acrylic acid, methyl and ethyl esters of acrylic and methacrylic acids.

*Example 6—Dimer acid polymers.*—The following ingredients are combined in a reaction kettle and heated to 180° F. in 30-to-60 minutes:

1.0 mol DER-332, the diglycidyl ether of Bisphenol-A, a commercially available diepoxide having an epoxy equivalent of 173–4;
0.5 mol dimer acid of naturally occurring $C_{18}$ fatty acid containing about 71 percent dimer, 26 percent trimer and about 3 percent monomer;
1.0 mol methacrylic acid.

The materials thereafter are heated to 210° F. in 3 hours and subsequently to 250° F. The reaction kettle is maintained at 250° F. until the acid value decreases to a low value, e.g., 3 to 5. The materials are cooled to 80° C. and mixed with about one-quarter of their weight of styrene whereby the final styrene solution contains about 20 percent by weight of styrene.

The styrene solution readily copolymerizes upon addition of a typical polymerization initiator such as benzoyl peroxide.

The styrene solution can be utilized directly as a gel-coat for molds which are utilized in the aircraft industry. Such molds can be heated to 500° F. without causing cracks in the gel coats when prepared with these styrene syrups.

The styrene solution can be blended with the dimethacrylate ester of diglycidyl ether of Bisphenol-A

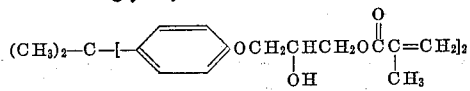

to form a copolymerizable blend which has particular utility as an electrical laminating resin. The cured articles which are prepared from such blended resin compositions have particularly good machinability.

We claim:
1. The polymerizable polyhydroxy polyester reaction product having ethylenically unsaturated terminal groups and being essentially free of unreacted epoxy groups, of 0.5 to 0.9 mol dicarboxylic acid, 1.0 to 0.2 mol ethylenically unsaturated monobasic carboxylic acid, and one mole diepoxy compound having no substituent capable of reacting with —COOH radicals other than hydroxyl.

2. A polymerizable polyester having terminal ethylenically unsaturated groups and having interposed
    (a) units of R(COO—)$_2$, and
    (b) units of

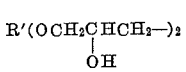

wherein R and R′ are divalent organic radicals.

3. A polymerizable polyester having terminal ethylenically unsaturated groups and having the formula

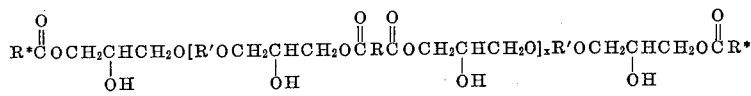

wherein
  R is a divalent organic radical of a dicarboxylic acid having the formula R(COOH)$_2$;
  R′ is a divalent organic radical of a diepoxide having the formula

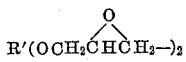

R* is an ethylenically unsaturated organic radical of an ethylenically unsaturated monobasic carboxylic acid having the formula R*COOH; and
  x is an integer from one to ten.

4. The polymerizable polyester of claim 3 wherein the R* is the ethylenically unsaturated organic radical of an ethylenically unsaturated monobasic carboxylic acid having the formula R*COOH selected from the class consisting of acrylic and methacrylic acid.

5. The polymerizable polyester of claim 3 wherein the R′ is the divalent organic radical

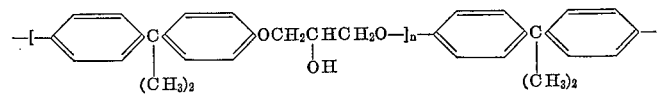

wherein n is an integer from zero to twenty.

6. The polymerizable polyester of claim 3 wherein the R is the divalent organic radical of the dicarboxylic acid R(COOH)$_2$ selected from the class consisting of phthalic acid, isophthalic acid, terephthalic acid, maleic acid, fumaric acid, adipic acid, succinic acid and their halogenated derivatives and dimers of long-chain fatty acids.

7. A polymerizable polyester having terminal ethylenically unsaturated groups and having the formula

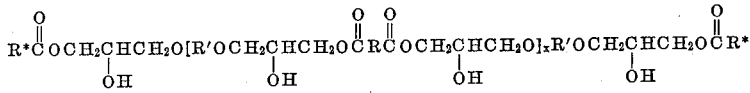

wherein
  x is an integer from one to ten;
  R is a divalent organic radical of dicarboxylic acid having the formula R(COOH)$_2$ selected from the class consisting of phthalic acid, isophthalic acid, terephthalic acid, maleic acid, fumaric acid, adipic acid, succinic acid and their halogenated derivatives and dimer acids of long chain fatty acids;
  R′ is a divalent organic radical having the formula

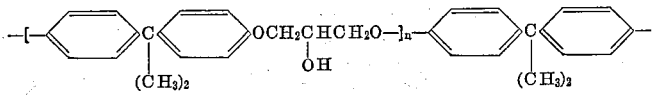

wherein
  n is an integer from zero to twenty; and
  R* is an ethylenically unsaturated organic radical selected from the class consisting of CH$_2$=CH— and $$CH_2=C- \atop \ \ \ \ |\ \ \ \ \atop CH_3$$

8. A polymerizable polyester having terminal ethylenically unsaturated groups and having interposed
    (a) units of R(COO—)$_2$, and
    (b) units of

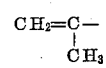

wherein
  R is a divalent organic radical selected from the class consisting of divalent saturated aliphatic radicals, divalent ethylenically unsaturated aliphatic radicals, a carbon-to-carbon bond, aryl radicals and halogenated aryl radicals; and
  R′ is a divalent organic radical derived from a dihydric compound selected from the class consisting of alkane diols and dihydric phenols having a formula selected from the class consisting of

[structures shown]

wherein R″ is selected from the class consisting of a carbon-to-carbon bond, a divalent aliphatic radical, a divalent aryl radical, and a —COOH substituted divalent aliphatic radical.

9. The process for preparing a polymerizable polyhydroxy polyester which comprises:
    (a) reacting a dicarboxylic acid with a diepoxy compound to form a diepoxy intermediate substance essentially free of unreacted —COOH groups; and
    (b) reacting the said diepoxy intermediate substance with an ethylenically unsaturated monobasic carboxylic acid to form the desired product having ethylenically unsaturated terminal groups and being essentially free of unreacted epoxy groups.

10. The process of preparing a polymerizable polyhydroxy polyester which comprises:

reacting 0.5 to 0.9 mol dicarboxylic acid, 0.2 to 1.0 mol of ethylenically unsaturated monobasic carboxylic acid and one mol of a diepoxide having no substituents capable of reacting with a —COOH radical other than hydroxyl, to produce a polyester product essentially free of unreacted epoxy groups and essentially free of unreacted —COOH groups, said polyester having ethylenically unsaturated terminal groups.

11. A copolymerizable resinous composition comprising the polymerizable polyester of claim 3 in combination with a copolymerizable monomeric cross-linking reagent having a terminal $CH_2{=}C{<}$ radical.

12. A copolymerizable resinous composition of claim 11 wherein the said copolymerizable monomeric cross-linking reagent is selected from the class consisting of styrene, vinyl toluene, divinyl benzene, acrylic acid, methacrylic acid, methyl and ethyl esters of acrylic and methacrylic acid.

13. A copolymerizable composition comprising the ethylenically unsaturated polyester of claim 3 in combination with (1) an ethylenically unsaturated polyester derived from the polyesterification of (a) polyhydric alcohol and
(b) dicarboxylic materials selected from the class consisting of dicarboxylic acid and dicarboxylic acid anhydride wherein at least a portion of the dicarboxylic material comprises alpha,beta-ethylenically unsaturated compounds; and (2) an ethylenically unsaturated monomeric cross-linking reagent having a terminal $CH_2{=}C{<}$ radical.

References Cited by the Examiner

UNITED STATES PATENTS

| | | | |
|---|---|---|---|
| 2,453,665 | 11/1948 | Kropa | 260—75 |
| 2,516,309 | 7/1950 | Fraser | 260—861 |
| 2,534,617 | 12/1950 | Mohrman | 260—861 |
| 2,824,851 | 2/1958 | Hall | 260—837 |
| 2,970,983 | 2/1961 | Newey | 260—78.4 |
| 3,066,112 | 11/1962 | Bowen | 260—41 |

LEON J. BERCOVITZ, *Primary Examiner.*

DONALD E. CZAJA, *Examiner.*

R. A. WHITE, *Assistant Examiner.*